United States Patent
Robbins et al.

(10) Patent No.: US 11,511,948 B2
(45) Date of Patent: Nov. 29, 2022

(54) ELECTROMAGNETIC SWITCH FOR SLIDING SHOE SORTER CONVEYOR SYSTEM UTILIZING REVERSED CURRENT FLOW IN ELECTROMAGNET COIL

(71) Applicant: LAFAYETTE ENGINEERING, INC., Danville, KY (US)

(72) Inventors: Robert Bruce Robbins, Danville, KY (US); Timothy Lee Johnson, II, Danville, KY (US); Michael Mckenna, Danville, KY (US); Charles O. Burdine, II, Danville, KY (US); Daniel Blake Robbins, Danville, KY (US)

(73) Assignee: LAFAYETTE ENGINEERING, INC., Danville, KY (US)

( * ) Notice: Subject to any disclaimer, the term of this patent is extended or adjusted under 35 U.S.C. 154(b) by 169 days.

(21) Appl. No.: 16/945,210

(22) Filed: Jul. 31, 2020

(65) Prior Publication Data

US 2022/0037103 A1 Feb. 3, 2022

(51) Int. Cl.
*B65G 47/84* (2006.01)
*H01H 51/08* (2006.01)
*H01H 50/44* (2006.01)

(52) U.S. Cl.
CPC .......... *B65G 47/844* (2013.01); *H01H 50/44* (2013.01); *H01H 51/08* (2013.01); *B65G 2207/36* (2013.01)

(58) Field of Classification Search
CPC .. B65G 47/844; B65G 2207/36; H01H 50/44; H01H 51/08
USPC ............................................ 198/890, 370.02
See application file for complete search history.

(56) References Cited

U.S. PATENT DOCUMENTS

| 3,450,246 | A | 6/1969 | Ariosto | |
| 5,409,095 | A * | 4/1995 | Hoshi | B65G 47/844 |
| | | | | 198/370.13 |
| 5,967,289 | A | 10/1999 | Kelsey | |
| 6,615,972 | B2 | 9/2003 | Veit et al. | |
| 6,951,274 | B2 * | 10/2005 | Zeitler | B65G 47/52 |
| | | | | 198/370.02 |
| 7,568,572 | B2 | 8/2009 | Zeitler et al. | |
| 8,469,177 | B2 * | 6/2013 | Steenwyk | B65G 47/844 |
| | | | | 198/370.02 |
| 9,008,831 | B1 | 4/2015 | Jacobs et al. | |
| 9,708,131 | B2 | 7/2017 | Fujihara et al. | |

(Continued)

FOREIGN PATENT DOCUMENTS

CN 107521955 12/2017

OTHER PUBLICATIONS

Shanghai Damon Logistics Technology Co., Dash SSS-III High Speed Sliding Shoe. Retrieved from http://www.damonconveyor.com/en/product/product.aspx?bid=60&aid=4&id=56. Jul. 28, 2020.

(Continued)

*Primary Examiner* — Gene O Crawford
*Assistant Examiner* — Keith R Campbell
(74) *Attorney, Agent, or Firm* — Middleton Reutlinger

(57) ABSTRACT

A method, electromagnetic switch, controller and program product, when energizing an electromagnetic coil to urge a selected shoe into a diverting path downstream of the electromagnetic switch, reverse current flow during at least a portion of the time that the electromagnetic coil is energized to recover energy from the electromagnetic coil.

45 Claims, 7 Drawing Sheets

(56) References Cited

U.S. PATENT DOCUMENTS

| | | | |
|---|---|---|---|
| 11,174,109 B1* | 11/2021 | Robbins | B65G 47/5104 |
| 2003/0132143 A1* | 7/2003 | Cochran | B65G 47/844 |
| | | | 209/916 |
| 2020/0023410 A1 | 1/2020 | Tamura et al. | |

OTHER PUBLICATIONS

Toyo Kanetsu K.K., Logistics Solution Division, Sorting System. Retrieved from http://www.tksl.co.jp/en/products-info/products-list/sort-sys/index.html Jul. 28, 2020.

* cited by examiner

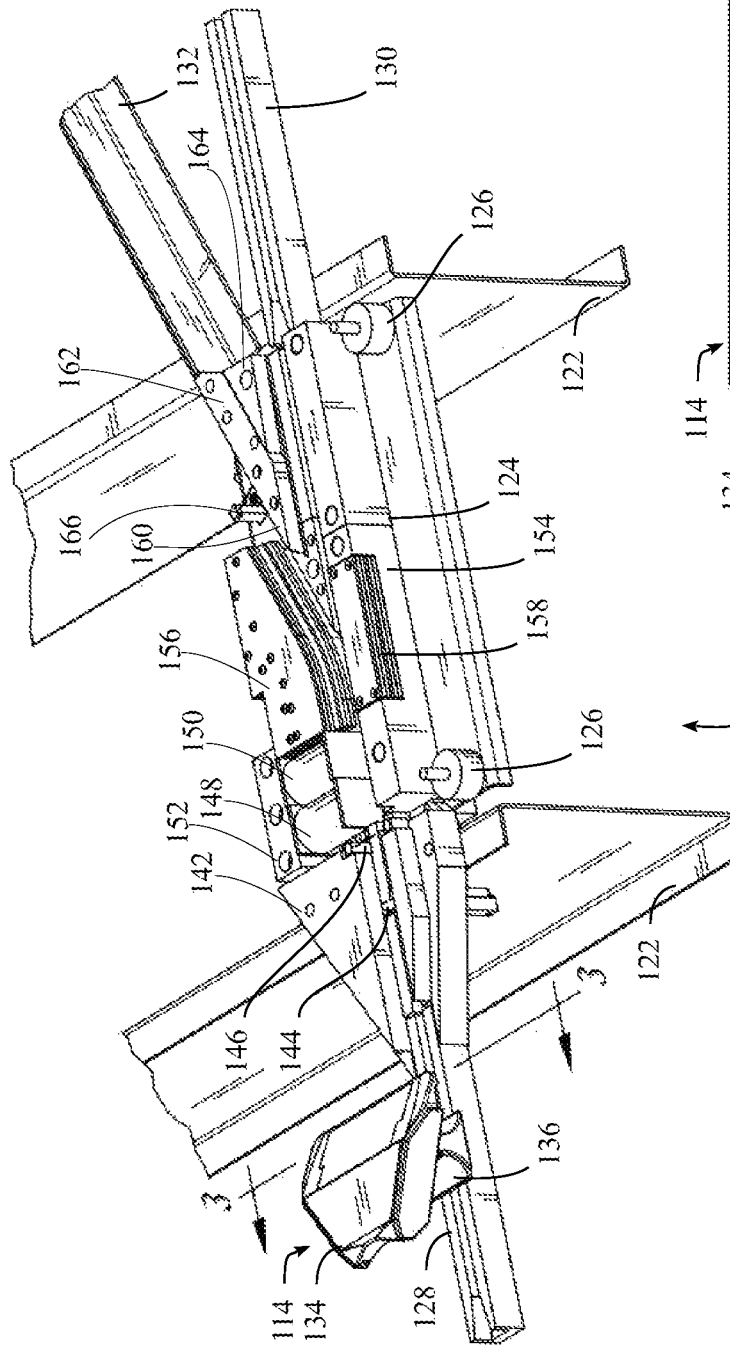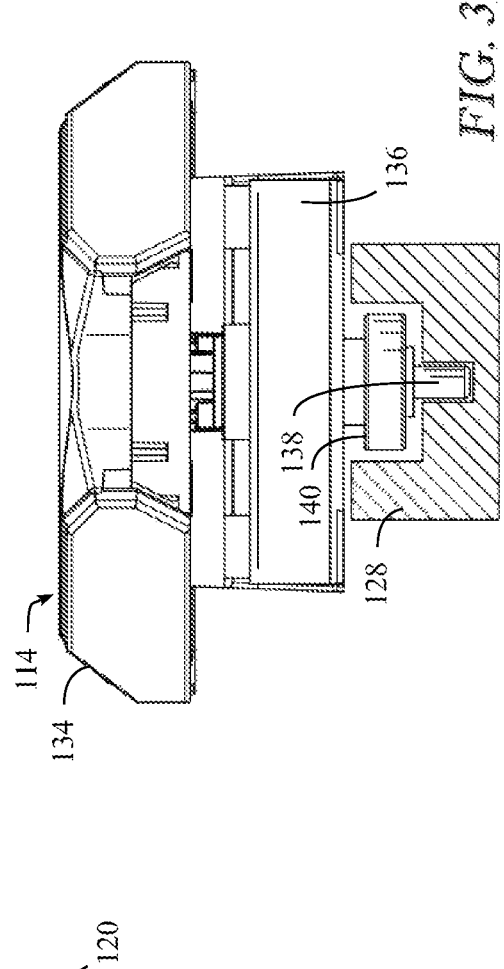

ELECTROMAGNETIC SWITCH FOR SLIDING SHOE SORTER CONVEYOR SYSTEM UTILIZING REVERSED CURRENT FLOW IN ELECTROMAGNET COIL

BACKGROUND

Conveyor systems are extensively used for various purposes, including, for example, in various manufacturing, packaging, shipping and distribution facilities. One particular use of some types of conveyor systems is in the sortation of packages and other articles carried from one or more sources to various different destinations. Sliding shoe sorter conveyor systems, for example, generally incorporate a primary conveyor including a series of rails that both serve as the support surface for conveyed articles as well as allow for the transverse movement (i.e., movement transverse to the movement of the conveyor surface) of pushing components commonly referred to as shoes to divert supported articles toward desired destinations by selectively "pushing" the supported articles off the side of the primary conveyor, e.g., onto a secondary conveyor or an inclined surface.

In some sliding shoe sorter conveyor systems, shoes are provided with structures (e.g., pins and/or bearings) disposed below the upper surfaces of the rails that are guided along a desired path to control the transverse positions of the shoes along the rails. While an article is being conveyed by the conveyor on one or more rails, the shoes on those rails are generally oriented proximate one of the sides of the conveyor and out of contact with the articles, in many cases using guides or channels that run along the underside of the conveyor surface and guide the pins and/or bearings of the shoes. At various points along the length of the conveyor where it may be desirable to divert articles to particular destinations, additional angled guides or channels are generally provided underneath the conveyor surface to guide the pins and/or bearings of shoes such that the shoes are moved from one side of the conveyor to the other as the rails upon which they are supported advance along the conveyor. By doing so, the shoes themselves are able to push any articles supported on the rails off the side of the conveyor and to a desired destination.

In order to selectively divert articles, an electromechanical component referred to as a switch is generally positioned underneath the conveyor surface upstream of each angled guide or channel to selectively divert shoes toward the angled guides or channels. While some switches incorporate movable mechanical components that route the pins and/or bearings of shoes from an input path to either a non-diverting path or a diverting path, other switches referred to herein as electromagnetic switches utilize magnetics for routing purposes, such that magnetic fields are used to draw the pins and/or bearings of shoes towards one of the non-diverting or diverting paths.

Electromagnetic switches are generally quieter and more reliable than mechanical switches due to the use of fewer moving parts. Nonetheless, electromagnetic switches generally require a substantial amount of electrical power to operate, and particularly at higher conveyor speeds (e.g., conveyor speeds in excess of about 350 feet per minute, are required to generate sufficiently strong magnetic fields in order to reliably divert shoes in the very limited time frame through which they pass through the switch. The electromagnetic coils in some switch designs, in particular, may generate substantial heat and may have reduced reliability as a result.

Therefore, a continuing need exists in the art for an efficient and reliable electromagnetic switch design for use with sliding shoe sorter conveyor systems.

SUMMARY

The invention addresses these and other problems associated with the art by providing a method, electromagnetic switch, controller and program product that, when energizing an electromagnetic coil to urge a shoe into a diverting path downstream of the electromagnetic switch, reverse current flow during at least a portion of the time that the electromagnetic coil is energized to recover energy from the electromagnetic coil.

Therefore, consistent with one aspect of the invention, a method of diverting a shoe on a conveyor with an electromagnetic switch configured to selectively direct the shoe from an input path to one of a non-diverting path and a diverting path may include energizing an electromagnetic coil of the electromagnetic switch to generate a magnetic field urging the shoe towards the diverting path, where energizing the electromagnetic coil includes supplying an electrical current to the electromagnetic coil, and while generating the magnetic field with the electromagnetic coil, alternating between supplying electrical current to the electromagnetic coil and reversing current flow through the electromagnetic coil to recover energy from the electromagnetic coil.

Some embodiments may also include receiving a direct current voltage across first and second power input terminals, where the electromagnetic coil includes first and second coil terminals, and alternating between supplying the electrical current to the electromagnetic coil and reversing current flow through the electromagnetic coil includes switching a drive circuit between a first state in which the first and second power input terminals are electrically coupled respectively to the first and second coil terminals of the electromagnetic coil and a second state in which the first power input terminal is electrically coupled to one of the second and first coil terminals of the electromagnetic coil to receive current flow from the electromagnetic coil.

Also, in some embodiments, the drive circuit includes an H-bridge circuit that couples the first and second power input terminals to the first and second coil terminals of the electromagnetic coil. Further, in some embodiments, the H-bridge circuit includes first and second legs coupled in parallel to one another and coupled across the first and second power input terminals, the first leg including a first switch coupled between the first power input terminal and the first coil terminal and a second switch coupled between the second power input terminal and the first coil terminal, and the second leg including a third switch coupled between the first power input terminal and the second coil terminal and a fourth switch coupled between the second power input terminal and the second coil terminal, where when in the first state, the first and fourth switches are closed and the second and third switches are open such that the first coil terminal is coupled to the first power input terminal through the first switch and the second coil terminal is coupled to the second power input terminal through the fourth switch.

In some embodiments, when in the second state, the first switch is closed and the second, third and fourth switches are open such that the first power input terminal is coupled to the first coil terminal through the first switch and the second power input terminal is electrically isolated from the first and second coil terminals. In addition, in some embodiments, when in the second state, the second and third switches are closed and the first and fourth switches are open such that the first coil terminal is coupled to the second power input terminal through the second switch and the second coil terminal is coupled to the first power input terminal through the third switch. In some embodiments, each of the first, second, third, and fourth switches includes a respective first, second, third and fourth MOSFET.

In addition, in some embodiments, each of the first, second, third, and fourth MOSFETs includes an N-channel MOSFET and includes a gate, a drain and a source, and each of the first, second, third, and fourth switches further includes a respective reverse biased diode coupled between the drain and the source thereof, and the drains of the first and third MOSFETs are coupled to the first power input terminal, the sources of the second and fourth MOSFETs are coupled to the second power input terminal, the source of the first MOSFET and the drain of the second MOSFET are coupled to the first coil terminal and the source of the third MOSFET and the drain of the fourth MOSFET are coupled to the second coil terminal. Moreover, in some embodiments, switching between the first and second states includes driving the gates of the first and fourth MOSFETs during the first state to close the first and fourth switches. In some embodiments, switching between the first and second states includes driving only the gate of the first MOSFET during the second state to close the first switch.

Moreover, in some embodiments, switching between the first and second states includes driving the gates of the second and third MOSFETs during the second state to close the second and third switches. In some embodiments, reversing current flow through the electromagnetic coil to recover energy from the electromagnetic coil includes storing energy recovered from the electromagnetic coil in at least one capacitor. In addition, in some embodiments, the at least one capacitor is coupled across the first and second power input terminals. In some embodiments, the at least one capacitor is disposed in a power supply coupled across the first and second power input terminals.

Some embodiments may further include, during a first portion of the energization of the electromagnetic coil, driving the electromagnetic coil to a peak current, and alternating between supplying the electrical current to the electromagnetic coil and reversing current flow through the electromagnetic coil is performed during a second portion of the energization of the electromagnetic coil to drive the electromagnetic coil with a hold-on current. Also, in some embodiments, the hold-on current is less than the peak current. In some embodiments, the hold-on current is about 75 percent of the peak current.

In addition, some embodiments may also include sensing a portion of the shoe approaching the electromagnetic switch, and determining a start time of the first portion of the energization of the electromagnetic coil in response to sensing the portion of the shoe approaching the electromagnetic switch to cause the electromagnetic coil to reach the peak current while the portion of the shoe is adjacent the electromagnetic coil. Also, in some embodiments, sensing the portion of the shoe approaching the electromagnetic switch includes determining a speed of the shoe approaching the electromagnetic switch. Moreover, in some embodiments, determining the speed of the shoe approaching the electromagnetic switch includes sensing the portion of the shoe approaching the electromagnetic switch at multiple positions.

Further, in some embodiments, the portion of the shoe includes a pin and a bearing, and sensing the portion of the shoe approaching the electromagnetic switch at multiple positions includes sensing one of the pin and the bearing at a first position among the multiple positions and sensing one of the pin and the bearing at a second position among the multiple positions. Some embodiments may also include determining a duration of each of the first and second portions of the energization of the electromagnetic coil in response to sensing the portion of the shoe approaching the electromagnetic switch. Some embodiments may further include determining a frequency of alternating between supplying the electrical current to the electromagnetic coil and reversing current flow through the electromagnetic coil in response to sensing the portion of the shoe approaching the electromagnetic switch. Some embodiments may also include determining a number of cycles to alternate between supplying the electrical current to the electromagnetic coil and reversing current flow through the electromagnetic coil in response to sensing the portion of the shoe approaching the electromagnetic switch.

Consistent with another aspect of the invention, an electromagnetic switch for selectively directing a shoe on a conveyor from an input path to one of a non-diverting path and a diverting path may include an electromagnetic coil, and a drive circuit coupled to the electromagnetic coil, the drive circuit configured to energize the electromagnetic coil to generate a magnetic field urging the shoe towards the diverting path, where the drive circuit is further configured to, during energization of the electromagnetic coil, alternate between supplying electrical current to the electromagnetic coil and reversing current flow through the electromagnetic coil to recover energy from the electromagnetic coil.

In some embodiments, the drive circuit includes first and second power input terminals across which is supplied a direct current voltage, the electromagnetic coil includes first and second coil terminals, and the drive circuit is configured to alternate between supplying the electrical current to the electromagnetic coil and reversing current flow through the electromagnetic coil by switching between a first state in which the first and second power input terminals are electrically coupled respectively to the first and second coil terminals of the electromagnetic coil and a second state in which the first power input terminal is electrically coupled to one of the second and first coil terminals of the electromagnetic coil to receive current flow from the electromagnetic coil.

Also, in some embodiments, the drive circuit includes an H-bridge circuit, the H-bridge circuit including first and second legs coupled in parallel to one another and coupled across the first and second power input terminals, the first leg including a first switch coupled between the first power input terminal and the first coil terminal and a second switch coupled between the second power input terminal and the first coil terminal, and the second leg including a third switch coupled between the first power input terminal and the second coil terminal and a fourth switch coupled between the second power input terminal and the second coil terminal, where when in the first state, the drive circuit closes the first and fourth switches and opens the second and third switches such that the first coil terminal is coupled to the first power input terminal through the first switch and the second coil terminal is coupled to the second power input terminal through the fourth switch.

In some embodiments, when in the second state, the first switch is closed and the second, third and fourth switches are open such that the first power input terminal is coupled to the first coil terminal through the first switch and the second power input terminal is electrically isolated from the first and second coil terminals. Further, in some embodiments, when in the second state, the second and third switches are closed and the first and fourth switches are open such that the first coil terminal is coupled to the second power input terminal through the second switch and the second coil terminal is coupled to the first power input terminal through the third switch.

In some embodiments, each of the first, second, third, and fourth switches includes a respective first, second, third and fourth N-channel MOSFET and includes a gate, a drain and a source, and each of the first, second, third, and fourth switches further includes a respective reverse biased diode coupled between the drain and the source thereof, and the drains of the first and third N-channel MOSFETs are coupled to the first power input terminal, the sources of the second and fourth N-channel MOSFETs are coupled to the second power input terminal, the source of the first N-channel MOSFET and the drain of the second N-channel MOSFET are coupled to the first coil terminal and the source of the third N-channel MOSFET and the drain of the fourth N-channel MOSFET are coupled to the second coil terminal.

Further, in some embodiments, the drive circuit is configured to switch between the first and second states by driving the gates of the first and fourth N-channel MOSFETs during the first state to close the first and fourth switches. Also, in some embodiments, the drive circuit is configured to switch between the first and second states by driving the gates of the first and fourth MOSFETs during the first state to close the first and fourth switches. In addition, in some embodiments, the drive circuit is configured to switch between the first and second states by driving only the gate of the first MOSFET during the second state to close the first switch.

Some embodiments may also include a power supply coupled across the first and second power input terminals and at least one capacitor configured to store energy recovered from the electromagnetic coil when in the second state. In addition, some embodiments may also include a controller coupled to the drive circuit and configured to, during a first portion of the energization of the electromagnetic coil, cause the drive circuit to drive the electromagnetic coil to a peak current, and during a second portion of the energization of the electromagnetic coil, cause the drive circuit to alternate between supplying the electrical current to the electromagnetic coil and reversing current flow through the electromagnetic coil with a hold-on current that is less than the peak current.

In addition, some embodiments may further include one or more sensors configured to sense a portion of the shoe approaching the electromagnetic switch, and the controller is configured to determine a start time of the first portion of the energization of the electromagnetic coil in response to sensing of the portion of the shoe approaching the electromagnetic switch by the one or more sensors to cause the electromagnetic coil to reach the peak current while the portion of the shoe is adjacent the electromagnetic coil. In addition, in some embodiments, the one or more sensors includes multiple sensors disposed at multiple positions, and the controller is further configured to determine a speed of the shoe approaching the electromagnetic switch in response to the sensing of the portion of the shoe approaching the electromagnetic switch by the one or more sensors.

In some embodiments, the portion of the shoe includes a pin and a bearing, and the multiple sensors includes a first sensor disposed at a first position and configured to sense one of the pin and the bearing and a second sensor disposed at a second position and configured to sense one of the pin and the bearing. Further, in some embodiments, the controller is further configured to determine a duration of each of the first and second portions of the energization of the electromagnetic coil in response to the sensing of the portion of the shoe approaching the electromagnetic switch by the one or more sensors. In addition, in some embodiments, the controller is further configured to determine a frequency of alternating between supplying the electrical current to the electromagnetic coil and reversing current flow through the electromagnetic coil in response to the sensing of the portion of the shoe approaching the electromagnetic switch by the one or more sensors. Further, in some embodiments, the controller is further configured to determine a number of cycles to alternate between supplying the electrical current to the electromagnetic coil and reversing current flow through the electromagnetic coil in response to the sensing of the portion of the shoe approaching the electromagnetic switch by the one or more sensors.

Consistent with another aspect of the invention, a controller for an electromagnetic switch configured to selectively direct a shoe on a conveyor from an input path to one of a non-diverting path and a diverting path may include one or more processors, and program code executable by the one or more processors to energize an electromagnetic coil of the electromagnetic switch to generate a magnetic field urging the shoe towards the diverting path, where the controller is configured to energize the electromagnetic coil by causing an electrical current to be supplied to the electromagnetic coil, and while the electromagnetic coil is energized to generate the magnetic field, alternate between causing the electrical current to be supplied to the electromagnetic coil and causing current flow to be reversed through the electromagnetic coil to recover energy from the electromagnetic coil.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention.

BRIEF DESCRIPTION OF THE DRAWINGS

FIG. 2 is a top perspective view of one example implementation of the electromagnetic switch of FIG. 1.

FIG. 3 is a cross-sectional view taken along lines 3-3 of FIG. 2.

DETAILED DESCRIPTION

Figure 1:
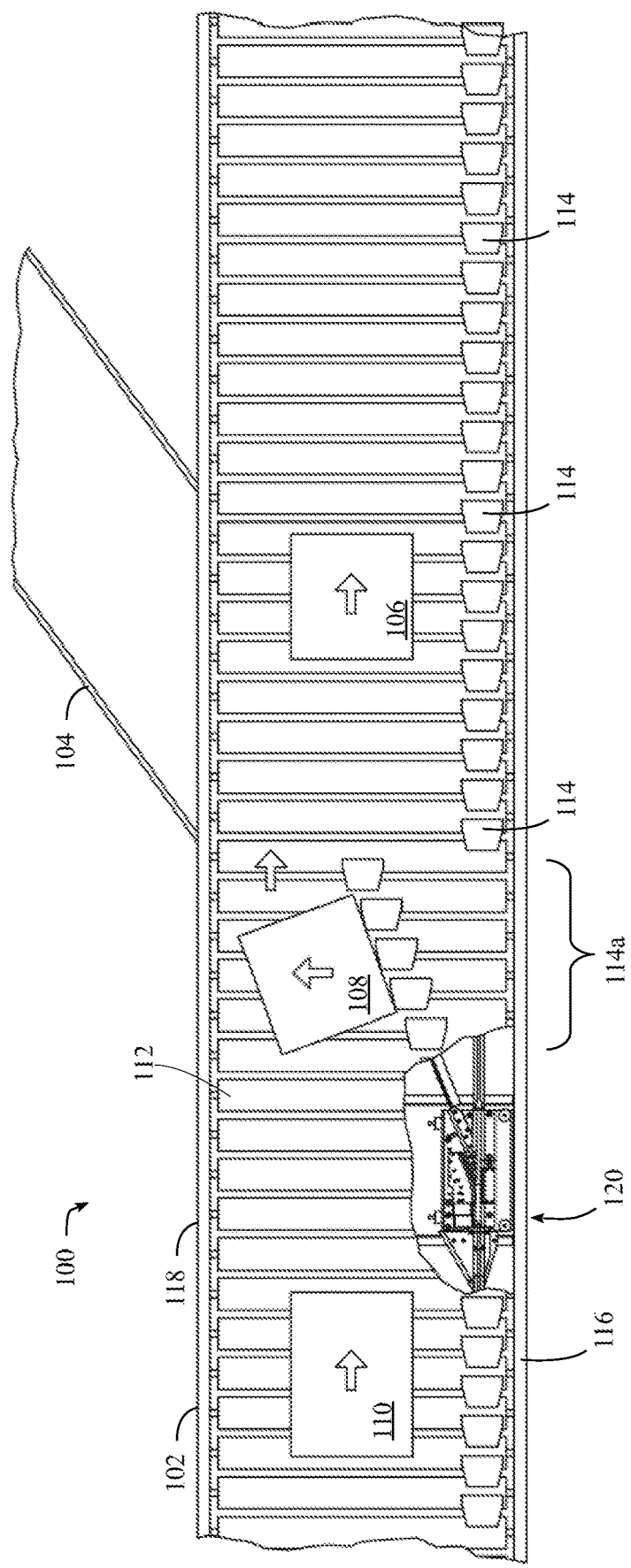
FIG. 1 shows a top plan view of a sliding shoe sorter conveyor system incorporating an electromagnetic switch consistent with some embodiments of the invention.

Turning to the drawings, wherein like numbers denote like parts throughout the several views, FIG. 1 illustrates a sliding shoe sorter conveyor system 100 suitable for implementing the various concepts disclosed herein. Sliding shoe sorter conveyor system 100 in the illustrated embodiment includes a primary conveyor 102 and a secondary conveyor 104 representing a destination or diversion point to which various articles (e.g., articles 106, 108, 110 illustrated in FIG. 1) may be selectively diverted. Articles 106, 108, 110 are supported on a conveyor surface defined in the illustrated embodiment by a plurality of rails 112, and a plurality of shoes 114 are slidably supported by the rails 112 to selectively divert articles to selected destinations or diversion points along primary conveyor 102. In the illustrated embodiment, shoes 114 are normally maintained to one side of the conveyor (e.g., along right side 116 or left side 118, where "right" and "left" are relative to the direction of conveyance for primary conveyor 102), and generally are not in contact with any articles while in this non-diverting position. Then, whenever it is desirable to divert any article (e.g., article 108 illustrated in FIG. 1), one or more shoes (e.g., shoes 114a illustrated in FIG. 1) are selectively diverted along a diverting path by an electromagnetic switch 120 to both contact and push the article laterally or transversely across the width of the primary conveyor and to the destination or diversion point (e.g., secondary conveyor 104 illustrated in FIG. 1).

In some embodiments, shoes 114 may be maintained to one side of primary conveyor 102 unless they are diverting an article and may return to the same side once the article has been diverted. In other embodiments, however, shoes may be capable of diverting articles to destinations on either side of primary conveyor 102, and thus shoes may be capable of being maintained on either side of the primary conveyor and selectively diverted to the opposite side in some embodiments. It will also be appreciated that a destination or diversion point to which shoes may divert an article may be another conveyor, an inclined surface, a bin, or any other suitable mechanism or receptacle for receiving diverted articles.

As noted above, shoes 114 are supported on rails 112, which in the illustrated embodiment are generally formed of extruded aluminum. It will be appreciated that sliding shoes may be used in connection with other types of conveyors, as well as with different types of rails and/or rails with different profiles and/or different materials. Other variations will be apparent to those of ordinary skill having the benefit of the instant disclosure.

FIGS. 2-5 illustrate an example implementation of electromagnetic switch 120 in greater detail. Electromagnetic switch 120 is supported between a pair of cross braces 122 that support the conveyor, and a switch body 124 is supported on a pair of spacer isolating rubber mounts 126. A pin guide 128 serves as an input path to the switch, with a non-diverting pin guide 130 serving as a non-diverting path and a divert guide angle 132 serving as a diverting path for the switch. Shoes 114 are thus received at the input path (pin guide 128) and either guided to the non-diverting path (non-diverting pin guide 130) or diverted to the diverting path (divert guide angle 132). While not shown in FIG. 2, divert guide angle 132 generally extends at an angle to the direction of conveyance to the opposite side of the conveyor to thereby guide shoes to the opposite side of the conveyor, where they are generally received by a pin guide (not shown) that extends generally parallel to the direction of conveyance.

With additional reference to FIG. 3, each shoe 114 includes a pusher body 134 formed of urethane or another pliable material and supported on a receiver 136 that is configured to slidably support the shoe between pairs of adjacent rails 112 (FIG. 1). A pin 138 extends through body 134 and receiver 136 and projects downwardly to be received in each pin guide, with a bearing 140 rotatably supported on pin 138. Pin 138 and bearing 140 are desirably formed of a ferromagnetic material such as steel, and as will be discussed in greater detail below, switch 120 selectively applies multiple magnetic fields to urge pin 138 and bearing 140 toward one of the diverting path and the non-diverting path for the switch.

A sensor mounting block 142 supports one or more sensors configured to sense a portion of each shoe 114 approaching switch 120. In the illustrated embodiment, the one or more sensors includes multiple sensors disposed at multiple positions to enable both a position and a speed of a shoe to be determined. Further, in the illustrated embodiment, the multiple sensors include a pin sensor 144 and a bearing sensor 146 that respectively sense the pin 138 and bearing 140 at different positions. Each of sensors 144, 146 may be implemented in some embodiments using photo-eyes or other optical sensors, although other presence detecting, position and/or speed sensors may be used in other embodiments.

In still other embodiments, as few as one sensor or more than two sensors may be used, and it will be appreciated that each sensor may sense the pin, the bearing, or some other portion of each shoe. Therefore, the invention is not limited to the specific sensors illustrated herein.

Switch 120 also includes a pair of electromagnetic coils 148, 150, also referred to herein as upstream and downstream electromagnetic coils, respectively, supported by a magnet mount 152. Electromagnetic coil 148 is considered to be upstream relative to electromagnetic coil 150, while electromagnetic coil 150 is configured to be downstream relative to electromagnetic coil 148, and it should be appreciated that the terms "upstream" and "downstream," as used in this application, are intended to define positions and movement relative to the direction movement of a shoe through switch 120, with downstream referring to the direction of movement of a shoe within switch 120 (generally from left to right in FIG. 2) and upstream referring to the opposite direction therefrom (generally from right to left in FIG. 2).

A guide block 154 is disposed opposite coils 148, 150 to define a channel through which the pin and bearing of each shoe passes, and downstream of coils 148, 150 on opposite sides of the channel are disposed a divert permanent magnet 156 and a non-divert permanent magnet 158. As will become more apparent below, whenever it is desirable to divert a shoe into the diverting path, coils 148, 150 are energized to subject the pin and bearing of the shoe to magnetic fields that urge the pin and bearing toward the coils, and desirably to position the pin and bearing adjacent the divert permanent magnet 156 as the shoe continues to move through the switch such that the magnetic field generated by the divert permanent magnet 156 engages the pin and bearing and directs the shoe into the diverting path. In contrast, when coils 148 and 150 are not energized, the pin and bearing of a non-diverted shoe will generally continue along the channel between the coils and guide block 154, and non-divert permanent magnet 158 is positioned to engage the pin and bearing of the non-diverted shoe to assist in guiding the shoe into the non-diverting path of the switch.

In the illustrated embodiment, each of permanent magnets 156, 158 is configured as a stack arrangement of ferromagnetic plates such as steel plates interleaved with non-ferromagnetic cage plates constructed of aluminum or a polymer material, and including apertures within which are received a plurality of rare earth magnets. It will be appreciated that the size, number and types of magnets, number and types of plates, etc. of each magnet 156, 158 may be varied in different embodiments, e.g., to tailor each magnet to provide a desired strength and orientation of magnetic field (e.g., about 15 pounds of force for each magnet in some embodiments). In addition, in some embodiments one or both of magnets 156, 158 may be omitted or substituted with one or more electromagnets. Therefore, the invention is not limited to the particular combination and orientation of electromagnetic coils and permanent magnets illustrated in FIG. 2.

As will become more apparent below, however, it is desirable in some embodiments to utilize a pair of coils 148, 150 and a downstream permanent magnet 156 to pull both the bearing and the pin of each shoe to be diverted into a diverting path, and to do so in a manner in which the energizing sequence of the coils is distributed over substantially a full pitch between shoes, which can lower peak current draw and spread overall energy consumption out over a longer period of time, and thereby lower overall power draw. In addition, each electromagnetic coil may be energized using dynamic current control to energize each coil at an appropriate time and bearing position to minimize wasted energy and inhibit the generated magnetic fields from affecting other bearings that are entering or have already passed through the switch. Further, the use of the permanent magnet downstream of the coils facilitates guiding each diverted shoe into the diverting path in an energy efficient manner.

Therefore, in some embodiments, a shoe may be diverted in an electromagnetic switch in part by sensing a portion of the shoe approaching the electromagnetic switch, in response to sensing the portion of the shoe approaching the electromagnetic switch, energizing a first electromagnetic coil while the shoe is adjacent the first electromagnetic coil to generate a first magnetic field urging the shoe towards the diverting path, and after energizing the first electromagnetic coil, energizing a second electromagnetic coil positioned downstream of the first electromagnetic coil while the shoe is adjacent the second electromagnetic coil to generate a second magnetic field further urging the shoe towards the diverting path. By doing so, the shoe may be positioned adjacent a permanent magnet disposed downstream of the second electromagnetic coil and proximate the diverting path such that a third magnetic field generated by the permanent magnet further urges the shoe towards the diverting path.

Returning to FIG. 2, switch 120 also includes a separator 160, e.g., formed of glass nylon or another suitable material, for separating the diverting and non-diverting paths, as well as a bearing bridge 162, formed of glass nylon or another suitable material, for engaging the bearing of each diverted shoe. A post diverter block 164 supports bearing bridge 162 and a divert confirm sensor 166, e.g., a photo-eye or other suitable sensor supported by a mounting block 168 (FIG. 4), may be positioned in the diverting path to confirm when a shoe is successfully diverted into the diverting path. A non-divert confirm sensor (not shown) may also be used in some embodiments, while in other embodiments sensor 164 may be omitted.

Figure 4:
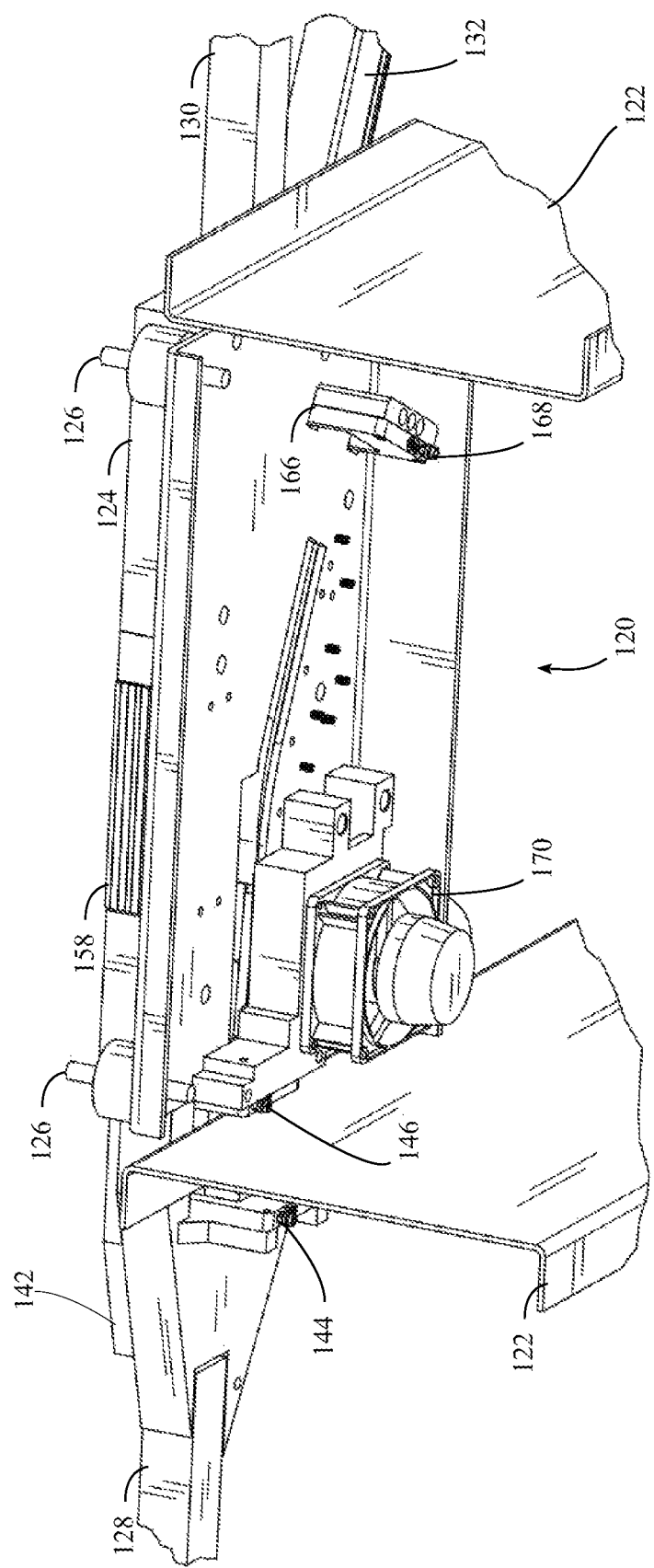
FIG. 4 is a bottom perspective view of the electromagnetic switch of FIG. 2.

In addition, with further reference to FIG. 4, one or more cooling fans 170 or other cooling systems (e.g., liquid cooling systems) may be used to cool coils 148, 150 during operation, as it will be appreciated that coils 148, 150 increase in resistance and thus decrease in efficiency as their temperature increases. As such, control over coil temperatures may be desirable in some embodiments.

Figure 6:
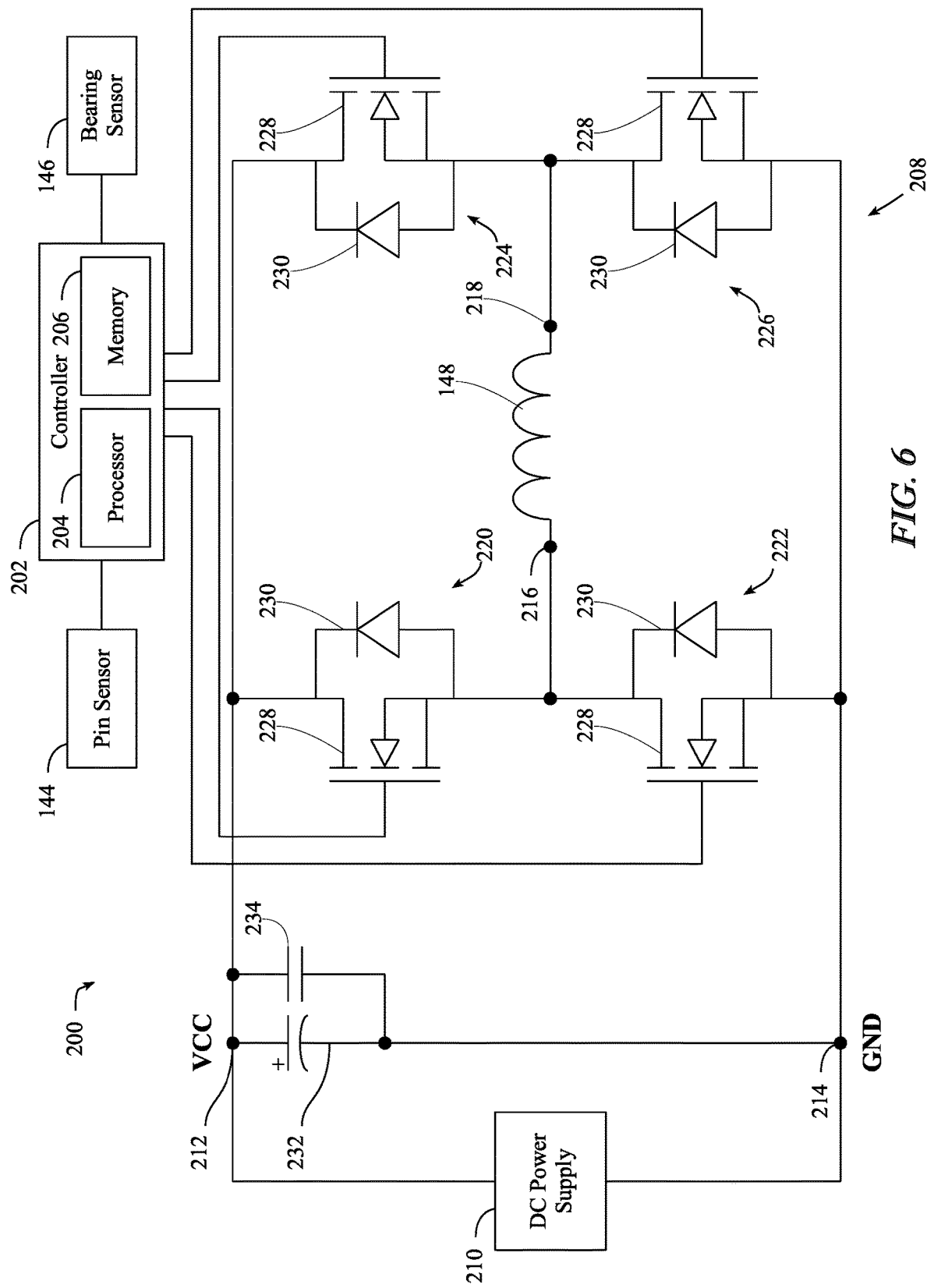
FIG. 6 is a block diagram of an example implementation of a control system suitable for use in controlling the electromagnetic switch of FIG. 2.

Now turning to FIG. 6, an example control system 200 for electromagnetic switch 120 is illustrated in greater detail. Control system 200 includes a controller 202, which may include one or more processors 204 and one or more memories 206, and which is configured to control a drive circuit 208 powered by a power supply 210 to energize one or more electromagnetic coils (e.g., electromagnetic coil 148 as shown in FIG. 6), e.g., responsive to signals output by pin and bearing sensors 144, 146. Power supply 210 may be configured as a DC power supply that applies a direct current voltage across a pair of power input terminals, positive power input terminal 212 and ground power input terminal 214, and drive circuit 208 may be configured to apply a voltage across a pair of electromagnetic coil terminals 216, 218 to allow for electric current to flow between power supply 210 and electromagnetic coil 148. In some embodiments, power supply 210 may provide about 170 VDC, and may include various power supply components such as regulators, AC/DC converters, filters, etc. as may be desired for a particular application and source of electrical power.

In the illustrated embodiment, drive circuit 208 includes an H-bridge including four switches 220, 222, 224 and 226, each controlled by controller 202. Switches 220 and 222 form a first leg of the H-bridge, with switch 220 coupled between power input terminal 212 and coil terminal 216 and switch 222 coupled between power input terminal 214 and coil terminal 216. Switches 224 and 226 form a second leg of the H-bridge, with switch 224 coupled between power input terminal 212 and coil terminal 218 and switch 226 coupled between power input terminal 214 and coil terminal 218.

Further, in the illustrated embodiment, each switch 220, 222, 224 and 226 includes a parallel arrangement of a MOSFET 228, e.g., an N-channel MOSFET and a reverse-biased diode 230. Each MOSFET 228 includes a gate, a drain and a source, and the drains of the MOSFETs 228 for switches 220 and 224 are coupled to power input terminal 212, while the sources of the MOSFETs 228 for switches 222 and 226 are coupled to power input terminal 214. The source of the MOSFET 228 for switch 220 and the drain of the MOSFET 228 for switch 222 are coupled to coil terminal 216 and the source of the MOSFET 228 for switch 224 and the drain of the MOSFET 228 for switch 226 are coupled to coil terminal 218.

The gate of each MOSFET 228 is coupled to controller 202. In one state, a Forward Voltage state, the MOSFETs 228 of switches 220 and 226 are closed while the MOSFETs 228 of switches 222 and 224 are opened to effectively apply a positive voltage potential across coil terminals 216, 218, thereby supplying current to energize electromagnetic coil 148. In a second state, a Reverse Voltage state, the MOSFETs 228 of switches 220 and 226 are opened while the MOSFETs 228 of switches 222 and 224 are closed to effectively apply a negative voltage potential across coil terminals 216, 218, thereby reversing current flow through electromagnetic coil 148, which as described in greater detail below, may be used to recapture or recover energy from the electromagnetic coil. In a third state, an Off/Disconnected state, the MOSFETs 228 of all four switches are opened to shut off the electromagnetic coil. In a fourth state, a Regenerative state, the MOSFET 228 of switch 220 is closed and the MOSFETs of switches 222, 224 and 226 are opened to both reverse current flow through the electromagnetic coil and to capture inductive spikes from the electromagnetic coil.

In order to recapture or recover energy from the electromagnetic coil, it may be desirable to include one or more capacitors or other energy storage device between electromagnetic coil 148 and DC power supply 210, e.g., polarized capacitor 232, which in the illustrated embodiment is coupled in parallel with a ceramic or other appropriate capacitor 234 for use in noise filtering. While capacitors 232, 234 are shown intermediate power supply 210 and the H-bridge of drive circuit 208 and coupled across power input terminals 212, 214, it will be appreciated that one or both of the capacitors may be resident within or otherwise be considered to be components of power supply 210 in other embodiments, or disposed elsewhere in control system 200.

Controller 202, as noted above, may include one or more processors 204 and one or more memories 206, and each memory 206 may represent the random access memory (RAM) devices comprising the main storage of controller 202, as well as any supplemental levels of memory, e.g., cache memories, non-volatile or backup memories (e.g., programmable or flash memories), read-only memories, etc. In addition, the memory may be considered to include memory storage physically located elsewhere in controller 202, e.g., any cache memory in a processor in a processor 204, as well as any storage capacity used as a virtual memory, e.g., as stored on a mass storage device or on another computer or electronic device coupled to controller 202. Controller 202 may also include one or more mass storage devices, e.g., a floppy or other removable disk drive, a hard disk drive, a direct access storage device (DASD), an optical drive (e.g., a CD drive, a DVD drive, etc.), and/or a tape drive, among others. Furthermore, controller 202 may include an interface with one or more networks (e.g., a LAN, a WAN, a wireless network, and/or the Internet, among others) to permit the communication of information to the components in electromagnetic switch 120 as well as with other computers and electronic devices. Controller 202 operates under the control of an operating system, kernel and/or firmware and executes or otherwise relies upon various computer software applications, components, programs, objects, modules, data structures, etc. Moreover, various applications, components, programs, objects, modules, etc. may also execute on one or more processors in another computer coupled to controller 202, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning controllers, computers and computer systems, those skilled in the art will appreciate that the various embodiments of the invention are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium that can be used to store the desired information and which can be accessed by controller 202. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

It will also be appreciated that for the sake of simplifying the illustration of drive circuit 208 in FIG. 6 illustrates only the components used to couple power supply 210 to electromagnetic coil 148. In order to drive electromagnetic coil 150, drive circuit 208 may include a second H-bridge circuit configured similar to the arrangement illustrated in FIG. 6, and thus may include four additional switches similar to switches 220, 222, 224 and 226, coupled in parallel to the H-bridge formed by switches 220, 222, 224, and 226, and controlled by separate control lines from controller 202. In this embodiment, both coils 148, 150 are driven by the same power supply 210 and utilize the same capacitor 232 as energy storage. In other embodiments, however, coils 148, 150 may be driven by separate power supplies, may utilize different drive circuits and/or may be controlled by different controllers.

Figure 5:
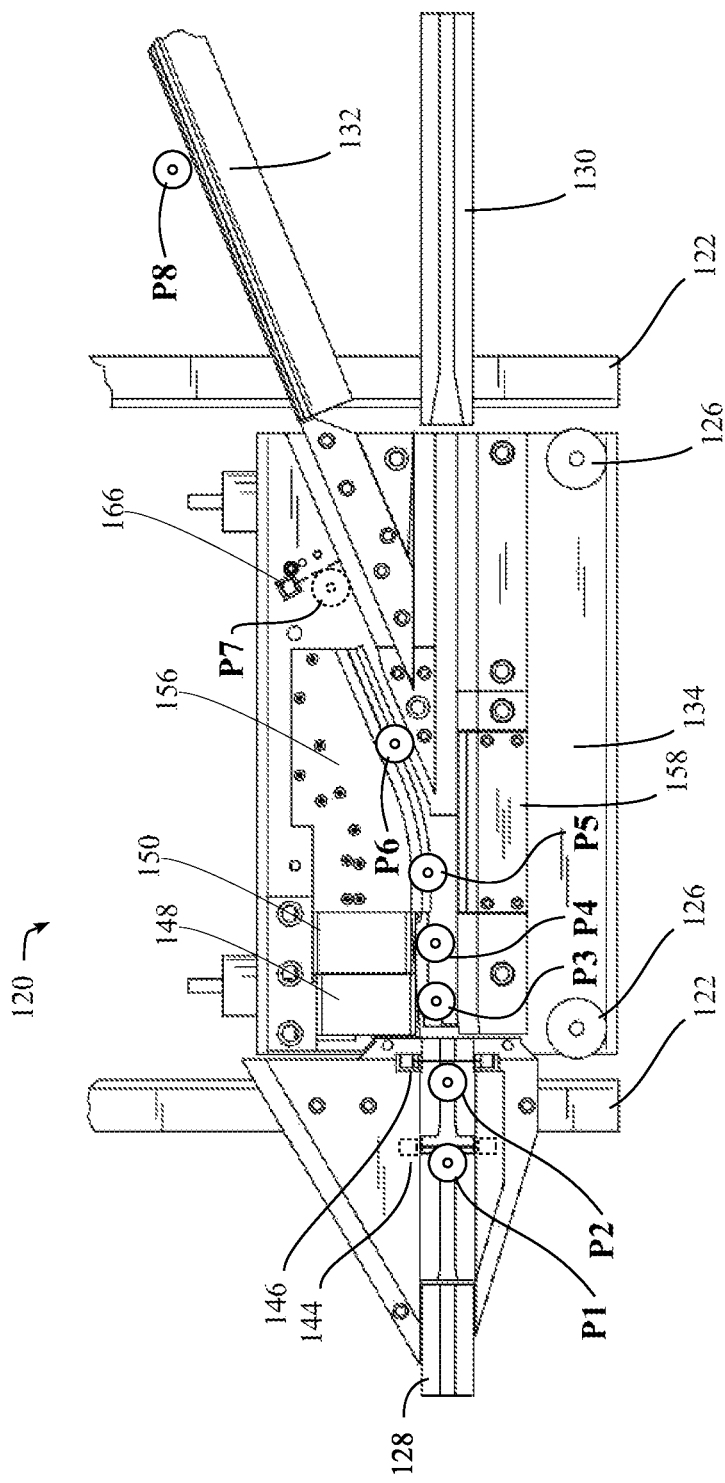
FIG. 5 is a top plan view of the electromagnetic switch of FIG. 2, and functionally illustrating multiple positions of a shoe as it passes through the electromagnetic switch.
Figure 7:
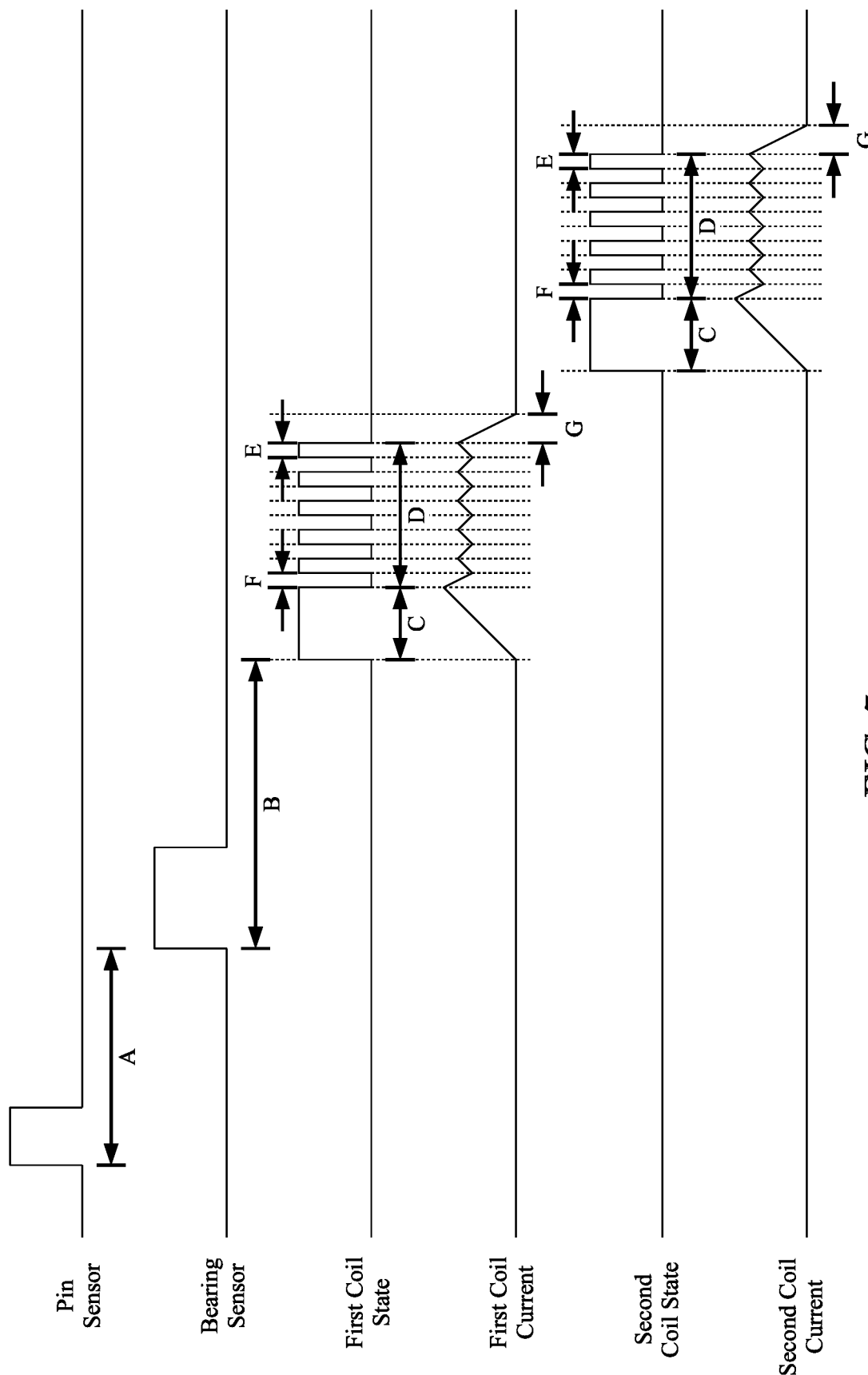
FIG. 7 is an example timing diagram suitable for use by the control system of FIG. 6.

Now turning to FIG. 7, and with additional reference to FIG. 5, an energization sequence for energizing coils 148, 150 in order to divert a shoe into a diverting path with electromagnetic switch 120 is illustrated in further detail. In particular, in some embodiments consistent with the invention, it is generally desirable to operate each electromagnetic coil 148, 150 in an energy efficient manner that supplies voltage and current to a coil such that the coil is energized on a dynamic timing schedule based upon the speed of the shoe passing through the switch geometry. In such embodiments, when a coil is deenergized (in this sense, the power to the coil is shutoff, but the coil has not yet returned to its equilibrium "off" state), some percentage of the current flowing out from the coil may be recaptured into a charge storage device (e.g., capacitor 232 of FIG. 6), and that stored energy may then be recirculated through the drive circuit again when the coil is reenergized for the next cycle. In this sense, a cycle may be considered to be a period where the current passing through the coil is raised to an acceptable level before the power is shutoff to allow the current to fall a small amount before being reenergized back to the acceptable level, and thereby maintaining an average hold-on current during at least a portion of the energization. By doing so, the current capacity of the electromagnetic coil is effectively artificially clipped, which in some embodiments may enable a low resistance coil, which would normally draw an immense amount of current, to be driven in a manner that enables current to flow through the coil quickly enough yet at a reduced rate that is sufficient to generate the necessary complex current induced magnetic field that ultimately urges the pin and/or bearing of a shoe into a diverting path. This magnetic field may be generated and deconstructed in a brief period of time such that the creation, sustained field, and destruction events all occur while the target pin and/or bearing is still passing in front of the face of the electromagnetic coil.

By capturing the reusable current flowing out from an electromagnetic coil in an expedited manner into a capacitive device, the amount of energy the coil is required to dissipate is reduced, and thus the temperature of the coil remains lower. This lower temperature generally keeps the internal DC resistance of the coil lower and allows the coil to maintain its original efficiency without wasting current as heat and RF energy due to a higher resistance as the temperature of the coil would normally raise.

The recovery operation may be accomplished by the aforementioned drive circuit incorporating an H-bridge configuration of switches capable of controlling current flow in several different states: Forward Voltage, Reverse Voltage, Off/Disconnected, and Regenerative. The Forward Voltage state (where switches 220 and 226 are on and switches 222 and 224 are off) may be used to drive the electromagnetic coil to generate a magnetic field, the Reverse Voltage state (where switches 220 and 226 are off and switches 222 and 224 are on) may be used to reverse current flow through the electromagnetic coil at the end of energization, the Off/Disconnected state (where all switches are off) may be used to shut off the electromagnetic coil, and the Regenerative state (where switch 220 is on and switches 222, 224 and 226 are off) may be used to both reverse current flow through the electromagnetic coil and to capture inductive spikes from the electromagnetic coil when maintaining the hold-on current during energization. By taking advantage of inductor characteristics and inductive spiking, the herein-described design may enable excess charge to flow back to the positive potential of the circuit's capacitors to improve overall energy efficiency within the circuit. In the Regenerative state, for example, a further optimization is provided over the reverse-bias diode, allowing for a greater capture of the inductive spike while also reducing the heat generated by the inductive spike by not needing to overcome the diode, and providing a substantial power savings for high frequency switching.

Therefore, in some embodiments consistent with the invention, a shoe may be diverted by an electromagnetic switch in part by energizing an electromagnetic coil of the electromagnetic switch to generate a magnetic field urging the shoe towards the diverting path, and while generating the magnetic field with the electromagnetic coil, alternating between supplying electrical current to the electromagnetic coil and reversing current flow through the electromagnetic coil to recover energy from the electromagnetic coil. In some instances, as will become more apparent below, an electromagnetic coil may be energized in two portions or phases, with the first portion or phase used to drive the electromagnetic coil to ramp up electrical current supplied to the first electromagnetic coil to a peak current, and with the second portion or phase used to maintain an average hold-on current supplied to the first electromagnetic coil, in part by alternating between supplying electrical current to the electromagnetic coil and reversing current flow through the electromagnetic coil.

Now turning to FIG. 7, and with additional reference to FIG. 5, an example timing diagram is provided to illustrate the timing of energization for coils 148, 150 by controller 202. The timing diagram has six different lines that illustrate the timing of different components of the sequence. The pin sensor line illustrates the detection of a pin of a shoe approaching the electromagnetic switch, e.g., as sensed by pin sensor 144 discussed above (generally corresponding to position P1 illustrated in FIG. 5), while the bearing sensor line illustrates the detection of a bearing of a shoe approaching the electromagnetic switch, e.g., as sensed by pin sensor 146 discussed above (generally corresponding to position P2 illustrated in FIG. 5). The first and second coil state lines represent the energization state of each of coils 148, 150, e.g., whether a positive voltage is applied across each coil. The first and second coil current lines, in turn, represent the instantaneous current flowing through the respective coil 148, 150 at any given time.

A number of control parameters used to drive each coil 148, 150 according to the first and second coil state lines may be dynamically determined based upon the sensed speed and position of a shoe, and the letters A-G are used to denote various aspects of the control.

The letter A represents the time between the rising edge of the pin sensor and the rising edge of the bearing sensor, which can be used to calculate the speed that a shoe is moving, as well as a start time for initiating an energization sequence for energizing each coil. In various embodiments, various control parameters may be determined and/or controlled, including, for example, the start time and/or duration for energizing each of coils 148, 150, the desired peak current to be pushed through each of coils 148, 150 (as it will be appreciated that higher speeds will generally require more current to pull the shoe within the smaller time envelopes), the desired average hold-on current maintained after applying the peak current (again, higher speeds generally require a higher holding current), the shutoff time or duration that each coil 148, 150 is no longer energized, and various characteristics of a hold-on current phase of the energization. The hold-on current phase, for example, may include alternating between supplying electrical current to the electromagnetic coil and reversing current flow through the electromagnetic coil, and as such the control parameters may include parameters such as a number of cycles to alternate between supplying electrical current to the electromagnetic coil and reversing current flow through the electromagnetic coil, a frequency of alternating between supplying electrical current to the electromagnetic coil and reversing current flow through the electromagnetic coil, a duration of supplying electrical current to the electromagnetic coil during each cycle, and a duration of reversing current flow through the electromagnetic coil during each cycle, among others. Additional control parameters may include, for example, the durations of the peak current and hold-on current phases, among other control parameters that will be apparent to those of ordinary skill having the benefit of the instant disclosure.

The letter B represents the delay between the rising edge of the bearing sensor, and the start time for the energizing sequence for coil 148.

The letter C represents the initial start point and duration for the peak current phase for each of coils 148, 150, which is timed so as to raise the respective coil 148, 150 to a desired peak current for a given shoe speed. It will be appreciated that as the shoe speed increases, a higher peak current may be desired, so the start point of the peak current phase may be advanced to an earlier point in time in order to allow the coil to reach peak current when the pin and/or bearing of the shoe is directly adjacent the coil (generally corresponding to position P3 for coil 148 and position P4 for coil 150 illustrated in FIG. 5).

The letter D represents the hold-on current phase duration, which maintains an approximation of a desired hold-on current passing through the coil for a predetermined length of time based at least in part on the speed of the shoe passing through the switch. In one example embodiment, the number of on-off cycles in this time may be varied directly with the total length of this period, or alternatively, a fixed number of cycles may be used, with the duration of each cycle (or the duration of the on and/or off portions of each cycle, designated by letters E and F in FIG. 7) varied appropriately.

The letter E represents a duration of an "ON" portion of each cycle during the hold-on current phase of energization, while the letter F represents an inductive spike recovery time where the coil is no longer in an "ON" state, but is passing some of its charge back into the capacitive storage system to be used during the next "ON" cycle due to a reversal in current flow enabled by the associated drive circuit.

The letter G represents the length of time required for the current to cease flowing through the coil and for the corresponding electromagnetic field to decay to a negligible strength.

In the illustrated embodiment, the Forward Voltage state, where switches 220 and 226 are on and switches 222 and 224 are off, is used during the C and E durations. The Regenerative state, where switch 220 is on and switches 222, 224 and 226 are off, is used during the F durations. The Reverse Voltage state, where switches 222 and 224 are on and switches 220 and 226 or off, is used during the G durations. In other embodiments, some or all of the F and G durations may both use the Regenerative state or the Reverse Voltage state, and in some embodiments, the Regenerative state may be used for the G durations and the Reverse Voltage state may be used for the F durations. Put another way, in some embodiments, the reversal of current in the electromagnetic coil while maintaining the hold-on current may be implemented by closing only switch 220, while in other embodiments, the reversal of current in the electromagnetic coil while maintaining the hold-on current may be implemented by closing switches 222 and 224. Other switch configurations suitable for reversing current flow through an electromagnetic coil may be used in other embodiments.

It will be appreciated that the peak current and the hold-on current may be selected in different embodiments in different manners, and in some embodiments, these values may be dependent upon speed or other factors. In some embodiments, it may be desirable for the hold-on current to be reduced relative to the peak current, e.g., about 75% of peak current in some embodiments. In addition, while other frequencies may be used for the cycles of the hold-on current phase, in some embodiments a frequency of about 10 kHz may be used. It will also be appreciated that different parameters may be used for the different coils in some embodiments.

Returning to FIG. 5, it will be appreciated that for a shoe being diverted to the diverting path, after coils 148, 150 are energized, advancement of a shoe will desirably cause the bearing of the shoe to engage with permanent magnet 156 (generally corresponding to position P5 illustrated in FIG. 5). The shoe then continues down the diverting path (generally corresponding to position P6 illustrated in FIG. 5) and is eventually confirmed as being successfully diverted when sensed by sensor 166 (generally corresponding to position P7 illustrated in FIG. 5). The shoe then exits switch 120 and continues along divert guide angle 132 (generally corresponding to position P8 illustrated in FIG. 5).

Figure 8:
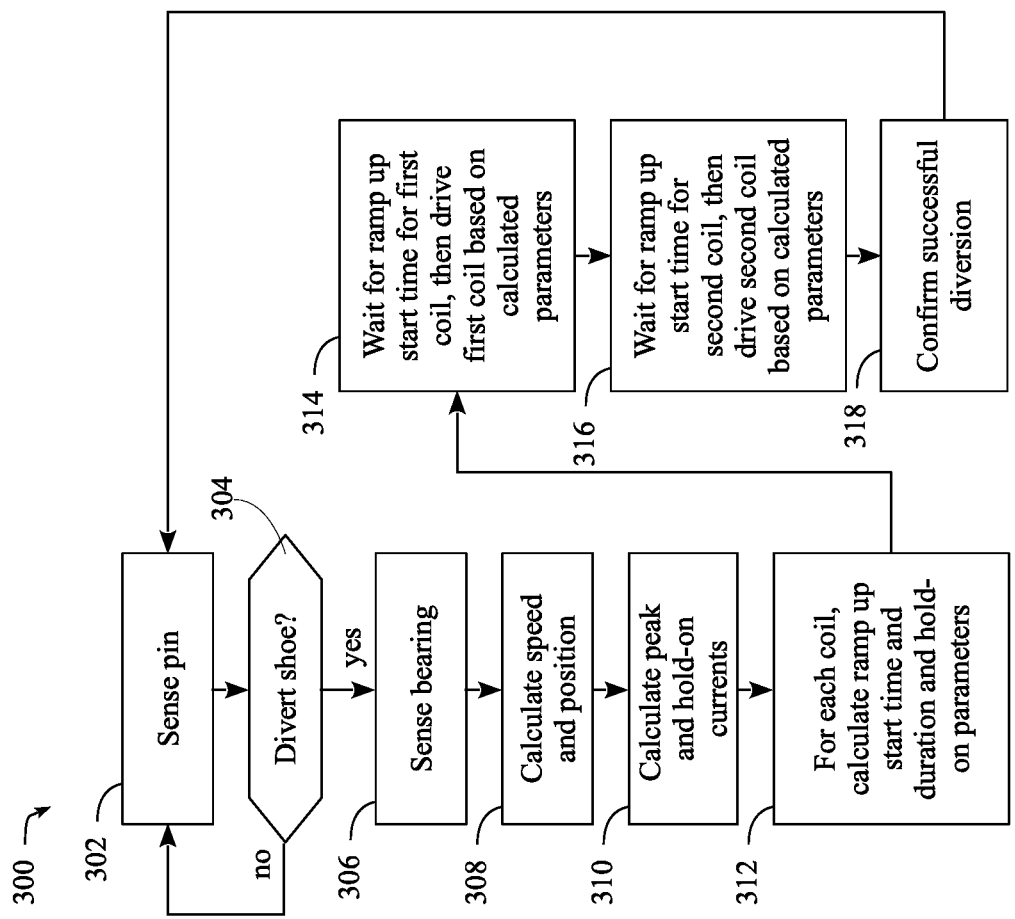
FIG. 8 is a flowchart illustrating an example sequence of operations for controlling the electromagnetic switch using the control system of FIG. 6.

FIG. 8 next illustrates an example sequence of operations 300 performed, for example, by controller 202 to process a shoe approaching the electromagnetic switch. First, in block 302, the controller awaits a signal from the pin sensor detecting a leading edge of the pin of the shoe. Next, in block 304, a determination is made as to whether the shoe should be diverted (e.g., based upon whether a signal has been received indicating that the shoe is adjacent an article on conveyor that is to be diverted to a destination associated with the electromagnetic switch). If not, control returns to block 302 to await the next shoe. In addition, it will be appreciated that the shoe will continue from the input path to the non-diverting path and exit the switch without being diverted, and that if used, a non-divert permanent magnet may be used to maintain the shoe in the non-diverting path.

If, however, the shoe is to be diverted, control passes to block 306 to await sensing the bearing of the shoe, indicated by a signal generated by the bearing sensor downstream of the pin sensor. Then, in block 308, the speed and position of the shoe may be calculated based upon the sensor inputs, and from the speed and/or position, a number of control parameters may be calculated in blocks 310 and 312. In block 310, for example, the speed of the shoe may be used to calculate desired peak and average hold-on currents. In block 312, the ramp up (peak current phase) start time and the duration and/or hold-on parameters may be calculated for each core, thereby establishing the control parameters for energizing each coil when the shoe is positioned directly adjacent the coil.

Block 314 then waits for the ramp up start time for the first coil, and then drives the first coil based upon the calculated parameters to initially ramp up to the desired peak current and then maintain a reduced hold-on current by repeatedly reversing current flow through the first coil during the hold-on phase of energization. Thereafter, block 316 waits for the ramp up start time for the second coil, and then drives the second coil based upon the calculated parameters to initially ramp up to the desired peak current and then maintain a reduced hold-on current by repeatedly reversing current flow through the second coil during the hold-on phase of energization.

Block 318 next optionally waits for a signal from a divert confirm sensor to confirm successful diversion of the shoe. In response to a failure to confirm, an error may be signaled or a corrective action may be taken. Control then returns to block 302 to wait for the next shoe. It will also be appreciated that pitch of the shoes may be such that multiple shoes may be passing through a switch at any given time, so the timing of various operations associated with different shoes may overlap in time in some embodiments.

Other embodiments will be apparent to those skilled in the art from consideration of the specification and practice of the present invention. Therefore the invention lies in the claims set forth hereinafter.

What is claimed is:

1. A method of diverting a shoe on a conveyor with an electromagnetic switch configured to selectively direct the shoe from an input path to one of a non-diverting path and a diverting path, the method comprising:
   energizing an electromagnetic coil of the electromagnetic switch to generate a magnetic field urging the shoe towards the diverting path, wherein energizing the electromagnetic coil includes supplying an electrical current to the electromagnetic coil; and
   while generating the magnetic field with the electromagnetic coil, alternating between supplying electrical current to the electromagnetic coil and reversing current flow through the electromagnetic coil to recover energy from the electromagnetic coil.

2. The method of claim 1, further comprising receiving a direct current voltage across first and second power input terminals, wherein the electromagnetic coil includes first and second coil terminals, and wherein alternating between supplying the electrical current to the electromagnetic coil and reversing current flow through the electromagnetic coil includes switching a drive circuit between a first state in which the first and second power input terminals are electrically coupled respectively to the first and second coil terminals of the electromagnetic coil and a second state in which the first power input terminal is electrically coupled to one of the second and first coil terminals of the electromagnetic coil to receive current flow from the electromagnetic coil.

3. The method of claim 2, wherein the drive circuit includes an H-bridge circuit that couples the first and second power input terminals to the first and second coil terminals of the electromagnetic coil.

4. The method of claim 3, wherein the H-bridge circuit includes first and second legs coupled in parallel to one another and coupled across the first and second power input terminals, the first leg including a first switch coupled between the first power input terminal and the first coil terminal and a second switch coupled between the second power input terminal and the first coil terminal, and the second leg including a third switch coupled between the first power input terminal and the second coil terminal and a fourth switch coupled between the second power input terminal and the second coil terminal, wherein when in the first state, the first and fourth switches are closed and the second and third switches are open such that the first coil terminal is coupled to the first power input terminal through the first switch and the second coil terminal is coupled to the second power input terminal through the fourth switch.

5. The method of claim 4, wherein when in the second state, the first switch is closed and the second, third and fourth switches are open such that the first power input terminal is coupled to the first coil terminal through the first switch and the second power input terminal is electrically isolated from the first and second coil terminals.

6. The method of claim 4, wherein when in the second state, the second and third switches are closed and the first and fourth switches are open such that the first coil terminal is coupled to the second power input terminal through the second switch and the second coil terminal is coupled to the first power input terminal through the third switch.

7. The method of claim 4, wherein each of the first, second, third, and fourth switches comprises a respective first, second, third and fourth MOSFET.

8. The method of claim 7, wherein each of the first, second, third, and fourth MOSFETs comprises an N-channel MOSFET and includes a gate, a drain and a source, wherein each of the first, second, third, and fourth switches further comprises a respective reverse biased diode coupled between the drain and the source thereof, and wherein the drains of the first and third MOSFETs are coupled to the first power input terminal, the sources of the second and fourth MOSFETs are coupled to the second power input terminal, the source of the first MOSFET and the drain of the second MOSFET are coupled to the first coil terminal and the source of the third MOSFET and the drain of the fourth MOSFET are coupled to the second coil terminal.

9. The method of claim 8, wherein switching between the first and second states includes driving the gates of the first and fourth MOSFETs during the first state to close the first and fourth switches.

10. The method of claim 9, wherein switching between the first and second states includes driving only the gate of the first MOSFET during the second state to close the first switch.

11. The method of claim 9, wherein switching between the first and second states includes driving the gates of the second and third MOSFETs during the second state to close the second and third switches.

12. The method of claim 2, wherein reversing current flow through the electromagnetic coil to recover energy from the electromagnetic coil includes storing energy recovered from the electromagnetic coil in at least one capacitor.

13. The method of claim 12, wherein the at least one capacitor is coupled across the first and second power input terminals.

14. The method of claim 12, wherein the at least one capacitor is disposed in a power supply coupled across the first and second power input terminals.

15. The method of claim 1, further comprising, during a first portion of the energization of the electromagnetic coil, driving the electromagnetic coil to a peak current, wherein alternating between supplying the electrical current to the electromagnetic coil and reversing current flow through the electromagnetic coil is performed during a second portion of the energization of the electromagnetic coil to drive the electromagnetic coil with a hold-on current.

16. The method of claim 15, wherein the hold-on current is less than the peak current.

17. The method of claim 16, wherein the hold-on current is about 75 percent of the peak current.

18. The method of claim 15, further comprising:
   sensing a portion of the shoe approaching the electromagnetic switch; and
   determining a start time of the first portion of the energization of the electromagnetic coil in response to sensing the portion of the shoe approaching the electromagnetic switch to cause the electromagnetic coil to reach the peak current while the portion of the shoe is adjacent the electromagnetic coil.

19. The method of claim 18, wherein sensing the portion of the shoe approaching the electromagnetic switch includes determining a speed of the shoe approaching the electromagnetic switch.

20. The method of claim 19, wherein determining the speed of the shoe approaching the electromagnetic switch includes sensing the portion of the shoe approaching the electromagnetic switch at multiple positions.

21. The method of claim 20, wherein the portion of the shoe includes a pin and a bearing, and wherein sensing the portion of the shoe approaching the electromagnetic switch at multiple positions includes sensing one of the pin and the bearing at a first position among the multiple positions and sensing one of the pin and the bearing at a second position among the multiple positions.

22. The method of claim 18, further comprising determining a duration of each of the first and second portions of the energization of the electromagnetic coil in response to sensing the portion of the shoe approaching the electromagnetic switch.

23. The method of claim 18, further comprising determining a frequency of alternating between supplying the electrical current to the electromagnetic coil and reversing current flow through the electromagnetic coil in response to sensing the portion of the shoe approaching the electromagnetic switch.

24. The method of claim 18, further comprising determining a number of cycles to alternate between supplying the electrical current to the electromagnetic coil and reversing current flow through the electromagnetic coil in response to sensing the portion of the shoe approaching the electromagnetic switch.

25. An electromagnetic switch for selectively directing a shoe on a conveyor from an input path to one of a non-diverting path and a diverting path, the electromagnetic switch comprising:
an electromagnetic coil; and
a drive circuit coupled to the electromagnetic coil, the drive circuit configured to energize the electromagnetic coil to generate a magnetic fielduring the shoe towards the diverting path, wherein the drive circuit is further configured to, during energization of the electromagnetic coil, alternate between supplying electrical current to the electromagnetic coil and reversing current flow through the electromagnetic coil to recover energy from the electromagnetic coil.

26. The electromagnetic switch of claim 25, wherein the drive circuit includes first and second power input terminals across which is supplied a direct current voltage, wherein the electromagnetic coil includes first and second coil terminals, and wherein the drive circuit is configured to alternate between supplying the electrical current to the electromagnetic coil and reversing current flow through the electromagnetic coil by switching between a first state in which the first and second power input terminals are electrically coupled respectively to the first and second coil terminals of the electromagnetic coil and a second state in which the first power input terminal is electrically coupled to one of the second and first coil terminals of the electromagnetic coil to receive current flow from the electromagnetic coil.

27. The electromagnetic switch of claim 26, wherein the drive circuit includes an H-bridge circuit, the H-bridge circuit including first and second legs coupled in parallel to one another and coupled across the first and second power input terminals, the first leg including a first switch coupled between the first power input terminal and the first coil terminal and a second switch coupled between the second power input terminal and the first coil terminal, and the second leg including a third switch coupled between the first power input terminal and the second coil terminal and a fourth switch coupled between the second power input terminal and the second coil terminal, wherein when in the first state, the drive circuit closes the first and fourth switches and opens the second and third switches such that the first coil terminal is coupled to the first power input terminal through the first switch and the second coil terminal is coupled to the second power input terminal through the fourth switch.

28. The electromagnetic switch of claim 27, wherein when in the second state, the first switch is closed and the second, third and fourth switches are open such that the first power input terminal is coupled to the first coil terminal through the first switch and the second power input terminal is electrically isolated from the first and second coil terminals.

29. The electromagnetic switch of claim 27, wherein when in the second state, the second and third switches are closed and the first and fourth switches are open such that the first coil terminal is coupled to the second power input terminal through the second switch and the second coil terminal is coupled to the first power input terminal through the third switch.

30. The electromagnetic switch of claim 27, wherein each of the first, second, third, and fourth switches comprises a respective first, second, third and fourth N-channel MOSFET and includes a gate, a drain and a source, wherein each of the first, second, third, and fourth switches further comprises a respective reverse biased diode coupled between the drain and the source thereof, and wherein the drains of the first and third N-channel MOSFETs are coupled to the first power input terminal, the sources of the second and fourth N-channel MOSFETs are coupled to the second power input terminal, the source of the first N-channel MOSFET and the drain of the second N-channel MOSFET are coupled to the first coil terminal and the source of the third N-channel MOSFET and the drain of the fourth N-channel MOSFET are coupled to the second coil terminal.

31. The electromagnetic switch of claim 30, wherein the drive circuit is configured to switch between the first and second states by driving the gates of the first and fourth N-channel MOSFETs during the first state to close the first and fourth switches.

32. The electromagnetic switch of claim 31, wherein the drive circuit is configured to switch between the first and second states by driving the gates of the first and fourth MOSFETs during the first state to close the first and fourth switches.

33. The electromagnetic switch of claim 31, wherein the drive circuit is configured to switch between the first and second states by driving only the gate of the first MOSFET during the second state to close the first switch.

34. The electromagnetic switch of claim 30, further comprising a power supply coupled across the first and second power input terminals and at least one capacitor configured to store energy recovered from the electromagnetic coil when in the second state.

35. The electromagnetic switch of claim 25, further comprising a controller coupled to the drive circuit and configured to, during a first portion of the energization of the electromagnetic coil, cause the drive circuit to drive the electromagnetic coil to a peak current, and during a second portion of the energization of the electromagnetic coil, cause the drive circuit to alternate between supplying the electrical current to the electromagnetic coil and reversing current flow through the electromagnetic coil with a hold-on current that is less than the peak current.

36. The electromagnetic switch of claim 35, further comprising one or more sensors configured to sense a portion of the shoe approaching the electromagnetic switch, wherein the controller is configured to determine a start time of the first portion of the energization of the electromagnetic coil in response to sensing of the portion of the shoe approaching the electromagnetic switch by the one or more sensors to cause the electromagnetic coil to reach the peak current while the portion of the shoe is adjacent the electromagnetic coil.

37. The electromagnetic switch of claim 36, wherein the one or more sensors includes multiple sensors disposed at multiple positions, and wherein the controller is further configured to determine a speed of the shoe approaching the electromagnetic switch in response to the sensing of the portion of the shoe approaching the electromagnetic switch by the one or more sensors.

38. The electromagnetic switch of claim 37, wherein the portion of the shoe includes a pin and a bearing, and wherein the multiple sensors includes a first sensor disposed at a first position and configured to sense one of the pin and the bearing and a second sensor disposed at a second position and configured to sense one of the pin and the bearing.

39. The electromagnetic switch of claim 36, wherein the controller is further configured to determine a duration of each of the first and second portions of the energization of the electromagnetic coil in response to the sensing of the portion of the shoe approaching the electromagnetic switch by the one or more sensors.

40. The electromagnetic switch of claim 36, wherein the controller is further configured to determine a frequency of alternating between supplying the electrical current to the electromagnetic coil and reversing current flow through the electromagnetic coil in response to the sensing of the portion of the shoe approaching the electromagnetic switch by the one or more sensors.

41. The electromagnetic switch of claim 36, wherein the controller is further configured to determine a number of cycles to alternate between supplying the electrical current to the electromagnetic coil and reversing current flow through the electromagnetic coil in response to the sensing of the portion of the shoe approaching the electromagnetic switch by the one or more sensors.

42. A controller for an electromagnetic switch configured to selectively direct a shoe on a conveyor from an input path to one of a non-diverting path and a diverting path, the controller comprising:
one or more processors; and
program code executable by the one or more processors to:
energize an electromagnetic coil of the electromagnetic switch to generate a magnetic field urging the shoe towards the diverting path,
wherein the controller is configured to energize the electromagnetic coil by causing an electrical current to be supplied to the electromagnetic coil; and
while the electromagnetic coil is energized to generate the magnetic field, alternate between causing the electrical current to be supplied to the electromagnetic coil and causing current flow to be reversed through the electromagnetic coil to recover energy from the electromagnetic coil.

43. The method of claim 1, wherein at least a portion of the shoe is formed of a ferromagnetic material, and wherein the magnetic field generated from energizing the electromagnetic coil draws the at least a portion of the shoe towards the diverting path.

44. The method of claim 1, wherein alternating between supplying the electrical current to the electromagnetic coil and reversing current flow through the electromagnetic coil is performed for a plurality of cycles while urging the shoe towards the diverting path.

45. The method of claim 1, wherein alternating between supplying the electrical current to the electromagnetic coil and reversing current flow through the electromagnetic coil is performed during at least a portion of the energization of the electromagnetic coil to drive the electromagnetic coil with a hold-on current.

\* \* \* \* \*